June 21, 1960 V. A. ANDERSON 2,941,630
PARKING BRAKE
Filed July 1, 1955
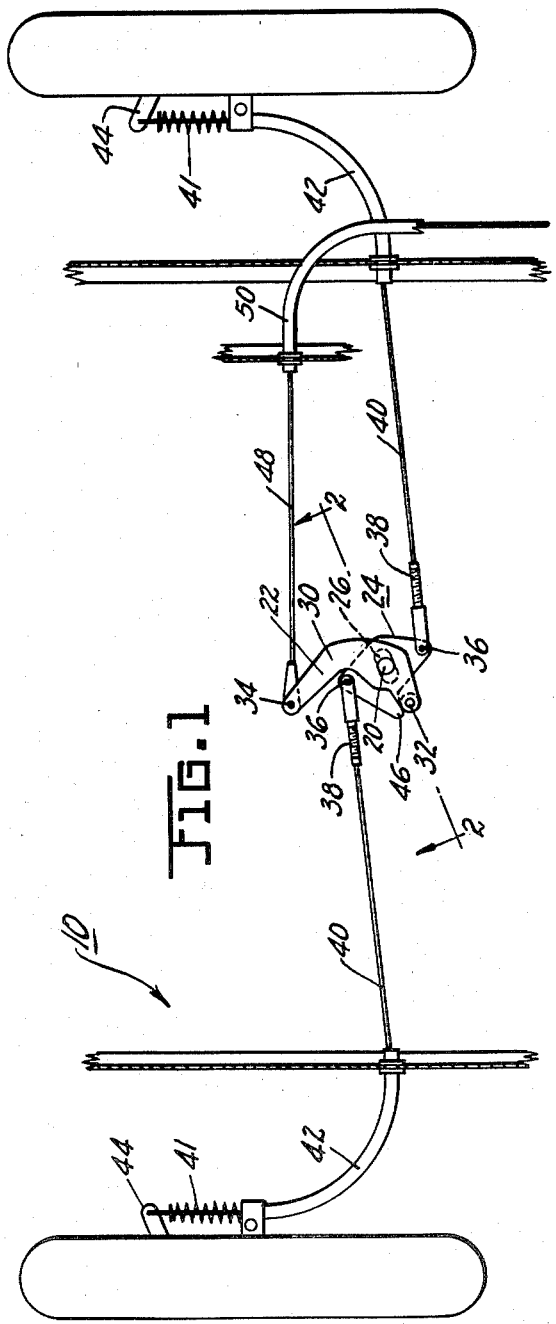
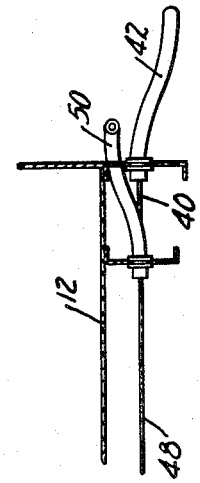
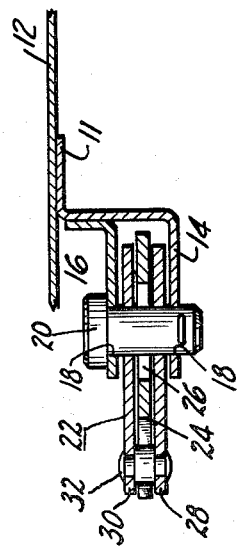
INVENTOR.
VERNAL A. ANDERSON
BY John A. Young
ATTORNEY

United States Patent Office 2,941,630
Patented June 21, 1960

2,941,630

PARKING BRAKE

Vernal A. Anderson, South Bend, Ind., assignor to Bendix Aviation Corporation, South Bend, Ind., a corporation of Delaware Filed July 1, 1955, Ser. No. 519,335

5 Claims. (Cl. 188—204)

This invention relates to a parking brake for two vehicle wheel brakes in which the brake system is responsive to manual operation of a single applying lever.

It is an object of the invention to provide a manually operated device for a pair of vehicle wheel brakes, wherein substantially equal applying force is exerted on each vehicle wheel brake irrespective of differences in extent of wear of the brakes.

A further object of the invention is to obtain a brake applying linkage which can be installed in relatively inaccessible locations on the vehicle. It is a further feature of the invention that the installation arrangements shall not introduce substantial losses in applying effort as they are translated through the linkage to the vehicle wheel brakes.

An additional object of my invention is to realize a low-cost parking brake linkage which can be incorporated into a trailer braking system and be capable of rendering reliable performance therein.

Other objects and features of the invention will become apparent from a consideration of the following description taken in connection with the accompanying drawings wherein:

Figure 1 is a top view of the brake assembly shown installed at the rear of a trailer bed, the trailer bed being shown removed;

Figure 2 is an enlarged detail view of the operating linkage looking in the direction indicated by the arrows 2—2 in Figure 1; and Figure 3 is a fragmentary front view of the conduit arrangement for applying the brake.

The operating linkage is cooperable with two rear wheels of a trailer, designated generally by reference numeral 10. A mounting bracket 11 (Figure 2) is welded or otherwise secured to panel 12 which is a part of the floor of the bed of the trailer. The mounting bracket 11 has two spaced apart projections 14 and 16 with aligned apertures 18 formed therein. A shaft 20 is received through the aligned apertures 18 in the two projections 14 and 16, and is held therein in any suitable manner.

A bell crank 22, and applying lever 24 are pivotally mounted on the shaft 20. The applying lever 24 has an elongated opening 26 (Figure 2) through which the shaft extends; the sides of the elongated opening 26 are free to slide over the shaft 20, thus making the applying lever 24 both free floating and pivoted on the shaft. The bell crank 22 consists of two stampings 28 and 30 which are held together by pins 32 and 34. The applying lever 24 is received between the spaced sides 28 and 30 of the bell crank and is guided therebetween. At diametrical ends 36 of the applying lever there are provided adjustors 38 with two flexible cables 40.

The cables 40 are threaded through conduits 42 and ultimately connect with applying levers 44 which operate the brakes.

Pin 32, at one end of the bell crank, bears against a boss 46 which is formed on the lever 24. A flexible cable 48 is fastened to pin 34 at the other end of the bell crank, and is threaded through a conduit 50 wherein it receives a change of direction leading to an accessible hand lever which is operated at the side of the trailer.

When it is desired to apply the brakes, an applying lever (not shown) is operated, thus tensioning cable 48 and causing the bell crank 28—30 to turn on the shaft 20. The pin 32 acts against boss 46 thus causing the applying lever 24 to turn in a clockwise direction (Figure 1). This movement of the applying lever produces a tensioning force on cables 40 which in turn exert a pulling force on brake actuating levers 44.

Assuming that the brakes are worn to different extents, the mechanism is yet designed to exert equal applying effort on the brakes since applying lever 24 can shift on a free-floating connection with the shaft 20. For example, if the brake on the left hand side of Figure 1 is worn to a greater extent than the brake on the right hand side, then the cable associated with the left hand brake must be pulled through a greater distance than the cable associated with the right hand brake. When these are the conditions, the lever 24 is free to move toward the right, tensioning the left hand cable and relaxing the right hand cable. In this way both of the wheel brakes will be applied to the same extent.

It will be further noted that the lever arm of the applying lever 24 is exactly the same for the right and left hand cables. In other words, applying effort developed by lever 24 will exert equal force on each cable since the distance of each adjustor 38 to the center of the applying lever is exactly the same.

When the operator releases effort on the applying cable 48, a spring (not shown) may be provided to rotate the bell crank 22 to its original position.

When the applying linkage is first installed on the vehicle, adjustment of the cables 40 is obtained through adjustors 38. The adjustors may consist of turnbuckles. The purpose of the adjustment is to provide means for tensioning the cables 40 a desired amount. In this way, manufacturing tolerances are compensated for, and the mounting bracket 10 may be located at a preferred position on the floor panel 12.

Additional return means can be provided in conjunction with the cables 40. The return means may consist of springs 41 which urge the brake applying levers 44 to a "brake-release" position.

An important aspect of the invention is reducing to a minimum necessity for extensive change in direction of the applying cables. It has been my experience, that applying effort which is transmitted through 90° bends by flexible cables involves a 25% loss for each 90° bend extending through a nine inch radius. This loss can very seriously affect the availbale applying effort which is ultimately communicated to the brake. It is necessary either to reduce the number of directional changes, or increase the input force.

With the arrangement shown, it will be noted that only one 90° bend is required for each cable between the point where the applying lever 24 acts thereupon and the point where the effort is exerted on the brakes. Thus with a 625 pound force exerted on cable 48 it is possible to obtain a 500 pound force which is ultimately exerted on the applying lever at the brake.

A further feature of the invention involves its compactness and its susceptibility of incorporation into relatively inaccessible locations. All that is required in assembling the linkage is to weld the bracket at a point approximately midway between the side rails of the trailer bed, and then position the components of the linkage on the mounting bracket.

Although this invention has been described and explained in connection with but a single embodiment, numerous applications of the invention will become apparent to those skilled in the art. Being aware of the modifications which can be made of the invention without departing from the principles thereof, I intend to include within the scope of the following claims all equivalent structure and arrangements thereof whereby the same or substantially the same objects of the invention may be accomplished.

I claim:

1. A manually operated parking brake linkage comprising a fixed bracket having spaced apart portions with aligned openings therein, a shaft received through the openings in said bracket and attached thereto, a bell crank which is made up of two matched stampings and is pivotally mounted on said shaft, a single camming pin at the applying end of said bell crank which also serves to secure the parts of said bell crank together, an applying lever floatably mounted on said shaft and turnable thereon, an abutment formed on the perimeter of said applying lever which is engageable with the camming pin of said bell crank whereby applying effort on said bell crank is transmitted to said applying lever for producing turning thereof on the shaft, two flexible brake-applying cables diametrically fastened to said applying lever whereby brake applying force is communicated to each of the brakes, said applying effort being substantially equal for each of said cables, means fastened to said bell crank for transmitting applying effort thereto, and means for relieving applying effort on said cables when the force on said bell crank is released.

2. A brake applying linkage in combination with a pair of laterally spaced apart vehicle wheels, said brake applying linkage comprising flexible means operatively connected to each of two vehicle brakes which are located at the respective vehicle wheels, a fixed shaft disposed perpendicularly and located between said wheels in substantially horizontal alignment therewith, an applying lever floatably associated with said shaft and pivoted thereon with the plane of rotation of said applying lever being transverse to the planes of said wheels, said flexible means being fastened at diametrical portions of said applying lever for tensioning along the length thereof producing substantially rectilinear movement, means for adjusting said flexible means to obtain preferred tensioning thereof, a second lever also pivotally mounted on said shaft, operator-controlled means for actuating said second lever, means for imparting brake-applying effort to said applying lever responsively to actuation of said second lever whereby said applying lever and second lever are pivoted together about said fixed shaft, said second lever including a pin at one end of said second lever and a boss on said applying lever which engages said pin, and means exerting effort on said applying lever whereby it is urged toward a brake release position when operator-controlled effort is relieved.

3. In combination with a pair of laterally spaced apart vehicle wheels each having a brake in combination therewith, a brake actuating linkage comprising a fixed pivot located between said wheels and in alignment therewith, a first lever floatably mounted on said pivot and arranged for a turnable movement in a plane transverse to the planes of said wheels, a flexible applying means fastened between diametral points of said first lever and each of the brakes combined with said wheels, a second lever overlying said first lever and also pivotally mounted on said pivot, and means for interlocking said levers, said means consisting of a cam formed on the outer periphery of said second lever which operatively engages a cam follower lobe constructed on the outer periphery of said first lever.

4. A brake applying linkage for use with a pair of laterally spaced apart vehicle wheels, said linkage comprising a fixed pivot located between said wheels and in alignment therewith, a first applying lever floatably mounted on said fixed pivot and having flexible connections with the brakes of said vehicle wheels and thereby arranged to exert equalized applying effort thereon, and a second applying lever which is constructed of two matched stampings which lie on either side of said applying lever, fastening means for securing said parts together, said fastening means being further arranged for engagement with said first applying lever to cause said first applying lever to rotate about said pivot, and a flexible applying linkage for exerting turning movement on said second lever.

5. In combination with a pair of laterally spaced apart vehicle wheels each having a brake in combination therewith, a brake actuating linkage comprising a fixed pivot located between said wheels and disposed in substantially horizontal alignment therewith, a first lever floatably mounted on said pivot and arranged for turnable movement in a plane transverse to the planes of said wheels, a second lever overlying said first lever and also pivotally mounted on said pivot, means for interlocking said levers, said means consisting of a cam formed on the outer periphery of said second lever which operatively engages a cam follower lobe constructed on the outer periphery of said first lever and flexible means interconnecting said first lever and each said brakes through right angle bands thereof at each said wheels terminating at each of the brakes in combination therewith, said flexible means being movable substantially rectilinearly responsively to turning movement of said first lever effected by movement of said second lever.

References Cited in the file of this patent

UNITED STATES PATENTS

| 1,771,832 | Andres | July 29, 1930 |
| 1,874,760 | Kitchen | Aug. 30, 1932 |
| 1,971,366 | Bischof | Aug. 28, 1934 |